(12) United States Patent
Meyer et al.

(10) Patent No.: US 7,672,958 B2
(45) Date of Patent: Mar. 2, 2010

(54) METHOD AND SYSTEM TO IDENTIFY RECORDS THAT RELATE TO A PRE-DEFINED CONTEXT IN A DATA SET

(75) Inventors: Alex Meyer, Palo Alto, CA (US); Shashikant Khandelwal, Palo Alto, CA (US); Dhiraj Pardasani, Palo Alto, CA (US); Ranjit Padmanabhan, Palo Alto, CA (US)

(73) Assignee: IM2, Inc., Palo Alto, CA (US)

( * ) Notice: Subject to any disclaimer, the term of this patent is extended or adjusted under 35 U.S.C. 154(b) by 349 days.

(21) Appl. No.: 11/113,880

(22) Filed: Apr. 25, 2005

(65) Prior Publication Data
US 2006/0161569 A1 Jul. 20, 2006

Related U.S. Application Data

(60) Provisional application No. 60/643,948, filed on Jan. 14, 2005.

(51) Int. Cl.
*G06F 17/00* (2006.01)
(52) U.S. Cl. .......................... 707/101; 707/1; 707/100; 715/713
(58) Field of Classification Search ............... 707/1–10, 707/100, 101; 715/713
See application file for complete search history.

(56) References Cited

U.S. PATENT DOCUMENTS

| | | | | |
|---|---|---|---|---|
| 6,141,655 | A * | 10/2000 | Johnson et al. | 707/2 |
| 6,611,843 | B1 * | 8/2003 | Jacobs | 707/102 |
| 7,103,838 | B1 * | 9/2006 | Krishnamurthy et al. | 715/202 |
| 2002/0129017 | A1 * | 9/2002 | Kil et al. | 707/6 |
| 2003/0037052 | A1 * | 2/2003 | Kitain et al. | 707/10 |
| 2003/0120621 | A1 * | 6/2003 | McDaniel et al. | 706/45 |
| 2003/0236793 | A1 * | 12/2003 | Karlsson | 707/101 |
| 2004/0064475 | A1 * | 4/2004 | Maeda et al. | 707/103 Y |
| 2005/0028091 | A1 * | 2/2005 | Bordawekar et al. | 715/514 |
| 2005/0237939 | A1 * | 10/2005 | Corl et al. | 370/235 |
| 2006/0242145 | A1 * | 10/2006 | Krishnamurthy et al. | 707/6 |

OTHER PUBLICATIONS

Nell Dale and David Teague, C++ Plus Data Structures, Second Edition, Publication 2001, p. 445-503.*
Frank M. Carrano and Janet J. Prichard, Data Abstracction and Problem Solving With C++, Third Edition, Publication 2002.*

* cited by examiner

*Primary Examiner*—Apu M Mofiz
*Assistant Examiner*—Thu Nga Nguyen
(74) *Attorney, Agent, or Firm*—William L. Botjer

(57) ABSTRACT

The present invention provides a method and a system for identifying relevant information in a data set. The method involves the identification of nodes of interest in a tree structure. A node of interest is a node that contains information, which is relevant to a pre-defined context. The method further involves the step of iteratively extracting sub-trees from the tree structure and identifying records in the extracted sub-trees. The sub-tree is a hierarchical structure that shows the relationship of each node of interest with its ancestor nodes in the tree structure. Each record is a group of sub-tree nodes and contains at least one node of interest.

6 Claims, 7 Drawing Sheets

METHOD AND SYSTEM TO IDENTIFY RECORDS THAT RELATE TO A PRE-DEFINED CONTEXT IN A DATA SET

REFERENCE TO RELATED APPLICATIONS

This patent application claims priority of U.S. Provisional Patent Application Ser. No. 60/643,948 filed on Jan. 14, 2005

This patent application is related to U.S. Provisional Patent Application Ser. No. 60/643,924 filed on Jan. 14, 2005, titled "Method and System for Information Extraction" the disclosure of which is hereby incorporated by reference.

BACKGROUND

The present invention relates to the field of information extraction, and more particularly to the field of identifying and extracting relevant information from independent sources of information.

The present age is witnessing the generation of large amounts of information. The sources of information, such as the Internet, store information in different forms. There is no common syntax or form for representing the information. Therefore, there is a need of information search techniques that can help in extracting relevant information from volumes of unstructured information available at different sources of information.

There are various conventional techniques that can be used to conduct search and extract the information available at various sources. One of the commonly used techniques is 'keyword search'. In this technique, a search is conducted based on some keywords that relate to a particular knowledge domain. For example, in the knowledge domain of online purchase of concert tickets, the keywords can pertain to the name of the artist, price, date, etc. The search is conducted based on keywords provided by a user. However, this technique has a few limitations. This technique generates a significant number of irrelevant results. This is primarily due to the reason that this technique does not recognize the context in which the keyword is being used. For example, if a user inputs the name of the artist and is looking for the artist's upcoming concerts, the technique may also generate results that may be related to the personal life of the artist. This type of information will be irrelevant for a person who is looking for tickets to the artist's show.

Further, the conventional techniques fail to incorporate the synonyms and connotations of the keywords that are rife in natural language content. For example, one of the keywords for an upcoming concert's tickets is concert. The conventional techniques do not incorporate the synonyms, such as show, program, performance etc Another commonly used technique for information extraction is 'wrapper induction'. It is a procedure designed to extract information from the information sources using pre-defined templates. Instead of reading the text at the sentence level, wrapper induction systems identify relevant content based on the textual qualities that surround the desired data. For example, a job application form may contain pre-defined templates for various fields such as name, age, qualification, etc. The wrappers, therefore, can easily extract information pertaining to these fields without reading the text on the sentence level.

However, different sources of information are not represented in a uniform format, there is a lack of common structural features across various sources of information. Hence, wrapper induction technique does not work efficiently.

Therefore, there exists a need for an extraction technique, which can identify the context in which the keywords are being used. The technique should be able to identify the information, which is relevant to the context. The technique should also identify and filter out the information, which is not relevant to the context, in order to yield efficient search results.

SUMMARY

An object of the present invention is to provide a method and a system for identifying relevant information.

In one embodiment, a method for identifying relevant information from a data set is provided. The data set contains information, arranged in the form of a tree structure. The method involves the identification of nodes of interest in the tree structure. A node of interest is a node that contains information relevant to a pre-defined context. For example, a pre-defined context may include online shopping for shoes. The method further involves the step of iteratively extracting sub-trees from the tree structure. The extraction of sub-trees is done by traversing an upward path for each node of interest. The sub-tree is a hierarchical structure that shows the relationship of each node of interest with its ancestor nodes in the tree structure. The method further involves the step of identifying records in the extracted sub-trees. Each record is a group of sub-tree nodes and contains at least one node of interest.

Further, the invention provides a system to execute the above-mentioned method. The system involves a node identifier to identify the nodes of interest. The system further involves a sub-tree extractor to iteratively extract the sub-trees. The system further involves a record selector to select the records that contain information which is relevant to a pre-defined context.

BRIEF DESCRIPTION OF THE DRAWINGS

The preferred embodiments of the present invention will hereinafter be described in conjunction with the appended drawings provided to illustrate and not to limit the present invention, wherein like designations denote like elements, and in which.

DESCRIPTION OF PREFERRED EMBODIMENTS

Figure 1:
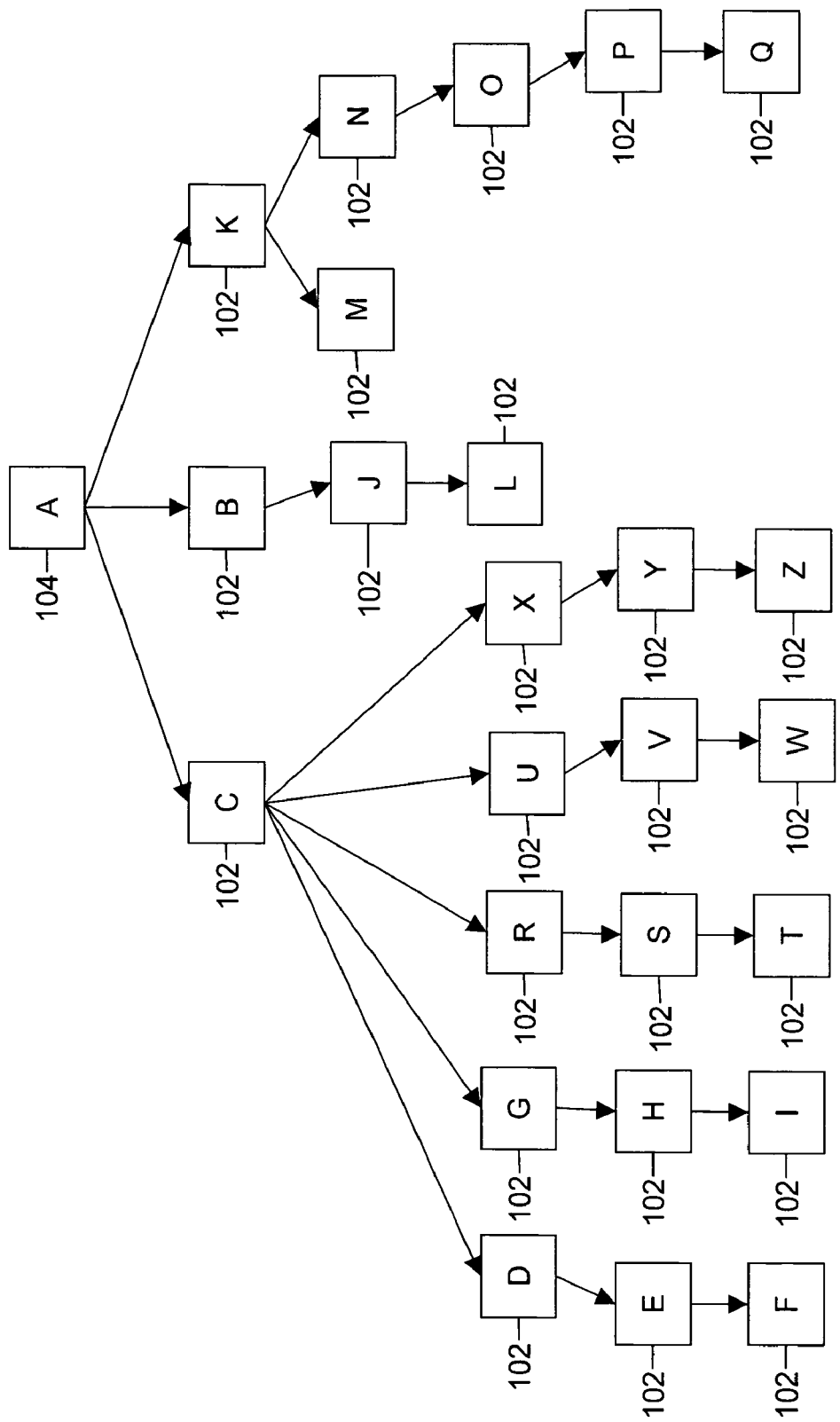
FIG. 1 is a block diagram illustrating an exemplary tree structure, which is used to represent the information.

For convenience, the terms used to describe the various embodiments are defined below. It should be noted that these definitions are provided to merely aid the understanding of the description, and that they in no way limit the scope of the invention.

Knowledge domain: A knowledge domain includes data pertaining to a specific field or domain.

Pre-defined context: The pre-defined context defines the objective, for which information is to be extracted. For example, a pre-defined context may include the online purchase of shoes. In this case, information like shoe size, brand, price etc., will constitute the information that is relevant to the pre-defined context.

Attributes: Attributes are the characteristics that define a knowledge domain. For example, in the knowledge domain of online purchase of concert tickets, the attributes are the name of the artist, venue of the concert, price of tickets, date of the concert, etc.

Domain model: Domain model is a structured description of a knowledge domain. Domain model includes attributes of a knowledge domain and the relationships between them.

Ancestor nodes: In a tree structure representation of data, for any given node, ancestor nodes include the nodes that fall on a path traversed from the root node of the tree structure to the given node. Root node is always included in the set of ancestor nodes.

Descendent nodes: In a tree structure representation of data, for a given node, descendent nodes include the nodes that fall on a path traversed from the given node to all leaf-nodes connected to the given node. All leaf-nodes connected to the given node are included in the set of descendent nodes.

Parent nodes: In a tree structure representation of data, parent nodes of a given node are the immediate ancestor nodes of the given node.

Child nodes: In a tree structure representation of data, child nodes of a given node are the immediate descendent nodes of the given node.

The present invention provides a method, system and a computer program product for extracting relevant information from data sets. The relevant information is the information pertaining to a pre-defined context. The pre-defined context defines the objective, for which information is to be extracted from the data sets. For example, a pre-defined context may include online shopping for shoes.

The data sets contain information pertaining to various knowledge domains. A knowledge domain includes data pertaining to a specific field or domain. A few examples of the knowledge domain include knowledge domains pertaining to information regarding online purchase of concert tickets, electronics, shoes, and the like. The knowledge domain is represented using a domain model. The domain model is a structural description of one or more attributes that relate to the knowledge domain, and the relationships between them. For example, the attributes relating to the knowledge domain pertaining to online purchase of tickets are name of artist, price, venue, and date.

The data set can be a text document, a web page, or any other source of information. In accordance with one embodiment of the invention, data sets are represented in the form of a tree structure. Each level in the tree structure contains elements, which contain information related to the attributes of the knowledge domain. FIG. 1 is a block diagram illustrating an exemplary tree structure. In the tree structure, the elements are represented as nodes 102. The top most level contains only one element and is represented as a root node 104. Nodes 102 are termed as either ancestor nodes or descendent nodes. Ancestor nodes of a given node include the nodes that fall on a path traversed from the root node of the tree structure to the given node. Root node is always included in the set of ancestor nodes. Descendent nodes of a given node include the nodes that fall on a path traversed from the given node to all leaf-nodes connected to the given node. All leaf-nodes connected to the given node are included in the set of descendent nodes. For example, using FIG. 1 as an illustration, K is an ancestor node that links to the descendent nodes, M, N, O, P and Q.

Figure 2:
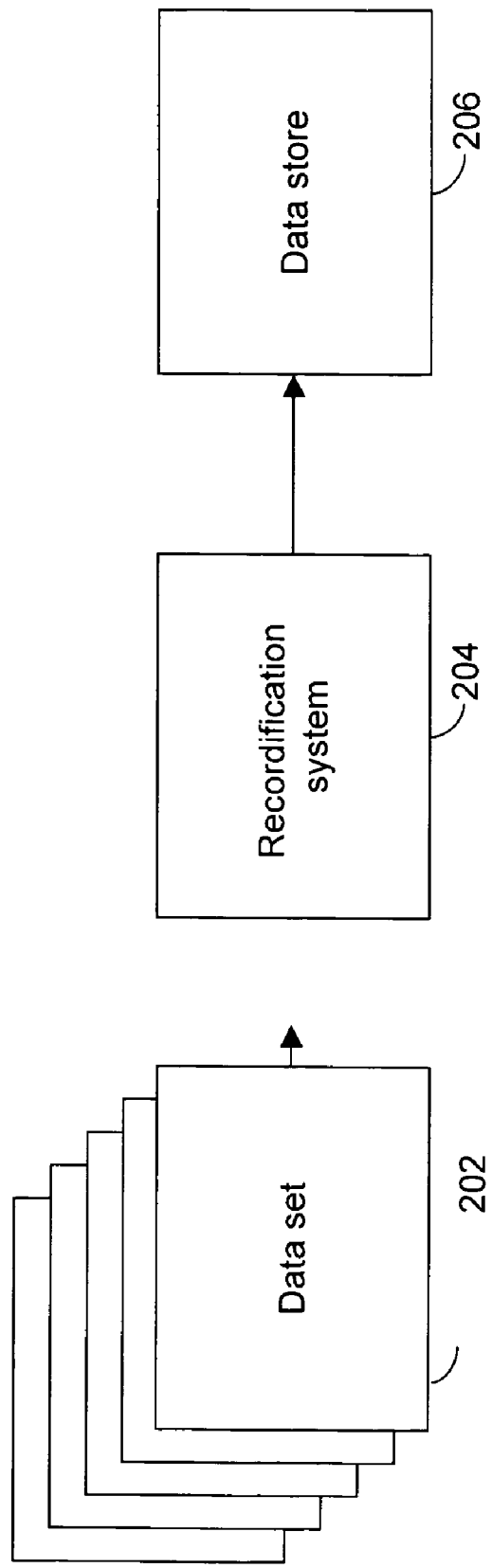
FIG. 2 is a block diagram illustrating the environment for the present invention, in accordance with one embodiment of the present invention.

FIG. 2 is a block diagram illustrating the environment for the present invention, in accordance with one embodiment of the present invention. FIG. 2 shows a plurality of data sets 202, which are used by a recordification system 204 to extract information. Recordification system 204 is further connected to a data store 206. Data sets 202 are represented in the form of tree structure.

Recordification system 204 identifies records in data sets 202. Each record is a group of nodes and contains information, which is relevant to a pre-defined context. For example, a pre-defined context may include online shopping for shoes. In the case of online purchase of shoes, for example, the relevant information will relate to brand name, price, model, availability, etc. The relevant information is then extracted from the records and stored in data store 206.

Figure 3:
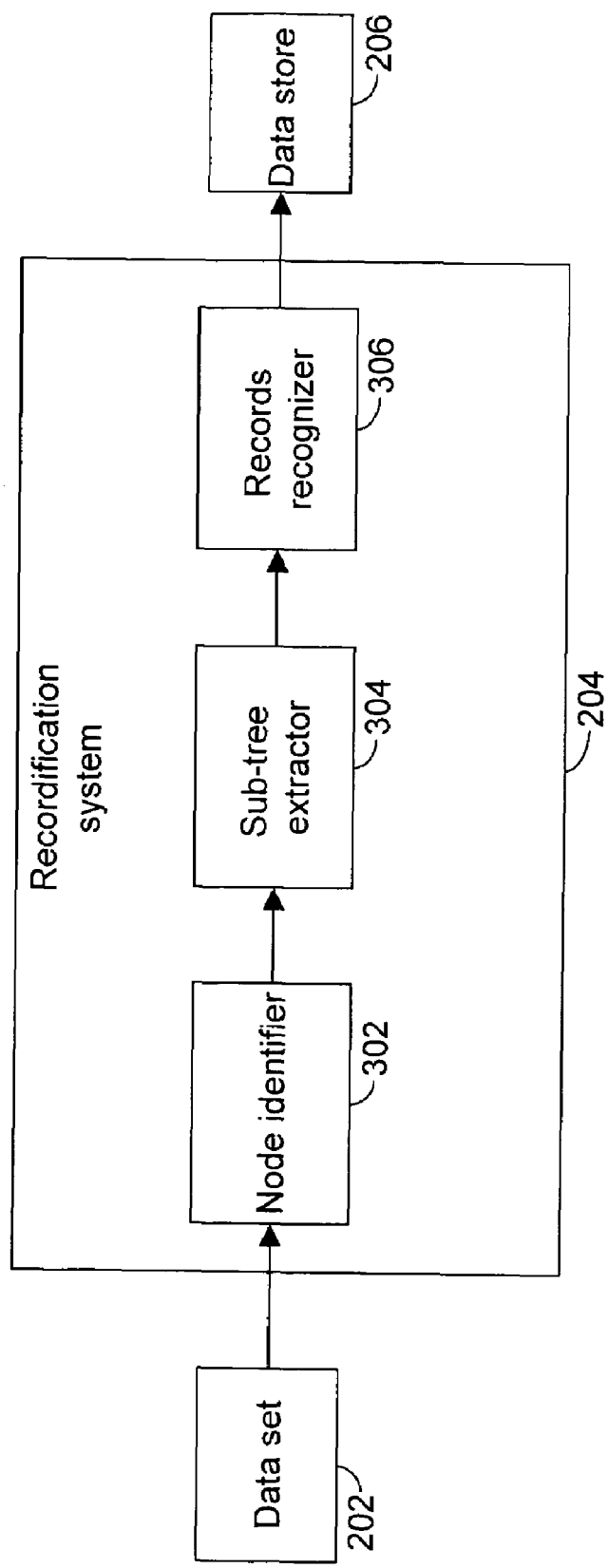
FIG. 3 is a block diagram illustrating elements of a recodification system, in accordance with one embodiment of the present invention.

FIG. 3 is a block diagram illustrating elements of recordification system 204, in accordance with an embodiment of the present invention. Recordification system 204 comprises a node identifier 302, a sub-tree extractor 304 and a records recognizer 306.

Node identifier 302 identifies nodes of interest in the tree structure. The nodes of interest are the nodes that contain information, which is relevant to the pre-defined context. The relevant information is the information that relates to the attributes of the knowledge domain. For example, in case of online purchase of shoes, the nodes of interest would be nodes that contain information about shoe price, model, brand or other such shoes related details.

Corresponding to the identified nodes of interest, sub-tree extractor 304 iteratively extracts sub-trees from the tree structure. Each sub-tree is a hierarchical structure showing the relationship of each node of interest with its ancestor nodes in the tree structure. Sub-tree extractor 304 selects a node of interest and traverses an upward path from the node of interest to the root node of the tree structure. For example, using FIG. 1 as an illustration, if F is a node of interest, then an upward path from node of interest F would be {F, E, D, C, A}. For example, in case of online purchase of shoes, F may contain information pertaining to the price of shoes, such as $50.

Similarly, sub-tree extractor 304 traverses upward paths from other nodes of interest. Further, sub-tree extractor 304 extracts sub-trees corresponding to each traversed path. For example, a sub-tree corresponding to the above-mentioned traversed path will be {A, C, D, E, F}. For example, such a sub-tree in the case of online purchase of shoes could appear as the one shown below:

{Shoes->Sport-shoes->Nike->Model XYZ->Price: $50}

Records recognizer 306 identifies the records that contain at least one node of interest. Each record is a group of sub-tree nodes and contains information that is relevant to the pre-defined context. The identified records are used to extract the relevant information. Records recognizer 306 is explained in further detail in conjunction with FIG. 4.

Figure 4:
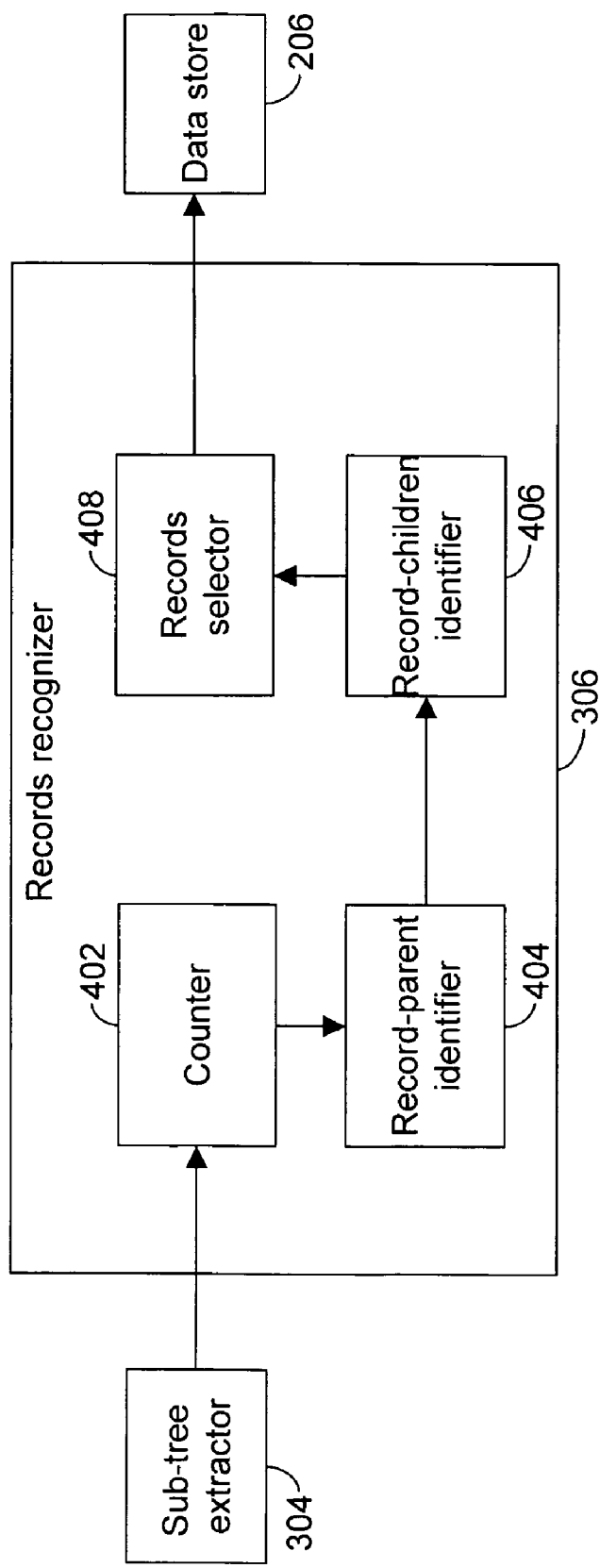
FIG. 4 is a block diagram illustrating elements of a records recognizer, in accordance with one embodiment of the present invention.

FIG. 4 is a block diagram that illustrates elements of records recognizer 306, in accordance with one embodiment of the present invention. Records recognizer 306 comprises a counter 402, a record-parent identifier 404, a record-children identifier 406 and a record selector 408.

Counter 402 counts the number of times each node appears in the extracted sub-trees. For example, using FIG. 1 as an illustration, if the extracted sub-trees are {A, C, D, E, F} and {A, C, G, H, I}, the count for the nodes D, E, F, G, H, I will be one. The count for the node C and A will be two. For example, in case of online purchase of shoes, if the extracted sub-trees are:

{Shoes->Sport-shoes->Nike->Model XYZ->Price: $50} and

{Shoes->Sport-shoes->Reebok->Model ABC->Price: $60}, the count for the nodes titled 'Nike', 'Model XYZ', 'Price: $50', 'Reebok', 'Model ABC', 'Price: $60' will be one. The count for the nodes titled 'Sport-shoes' and 'Shoes' will be two.

Based on the count, record-parent identifier 404 identifies record-parents. The record-parents are the parent nodes of the records that contain at least one node of interest. Record-parent identifier 404 scans the upward path corresponding to each extracted sub-tree. Therefore, according to the previous example, the paths scanned will be {F, E, D, C, A} and {I, H, G, C, A}. The lowest nodes in the extracted sub-trees, which have a count greater than one, are the record-parents. Therefore, according to previous example, node C will be a record-parent. For example, in case of online purchase of shoes, the node titled 'Sport-shoes' will be a record-parent.

Record-children identifier 406 identifies record-children. The record-children are the child nodes of the record-parents. Child nodes of a given node are the immediate descendent nodes of the given node. For example, using FIG. 1 as an illustration, if the record-parent is C, the corresponding record-children will be D and G. For example, in case of online purchase of shoes, if the node titled 'Sport-shoes' is a record-parent, the corresponding record-children will be the nodes titled 'Nike' and 'Reebok'.

The record-children are identified to select the records that contain information, which is relevant to the pre-defined context.

Based on the identified record-children, record selector 408 selects the records, which contain information relevant to the pre-defined context. Each record includes at least one record-children and nodes that are descendents of the record-children. For example, in FIG. 1, considering D and G as record-children, the corresponding records will be {D, E, F} and {G, H, I} respectively. Hence, the record-children are the root nodes of the selected records. For example, in case of online purchase of shoes, considering the nodes titled 'Nike' and 'Reebok' as record-children, the corresponding records will be {Nike->Model XYZ->Price: $50} and {Reebok->Model ABC->Price: $60}

The selected records contain information, which is relevant to the pre-defined context. For example, the records {D, E, F} and {G, H, I} contain nodes F and I, which have been identified as nodes of interest. Hence, the records contain information, which is relevant to the pre-defined context.

In one embodiment of the invention, the patterns in the structure of the selected records are used to identify additional records in the data set. The records in the data set, which have a structure similar to the selected records are identified as additional records. For example, using FIG. 1 as an illustration, the records {R, S, T}, {U, V, W} and {X, Y, Z} have a pattern similar to that for the previously selected records {D, E, F} and {G, H, I}. Hence, the records {R, S, T}, {U, V, W} and {X, Y, Z} are identified as additional records. For example, in the case of online purchase of shoes, the additional records can be {Adidas->Model RST->Price: $100}, {Fila->Model 123->Price: $75} and {Lotto->Model X->Price: $80}.

The selected and additional records are used to extract the relevant information. For example, in case of online purchase of shoes, the information related to the price of different models and brands of sports-shoes will be extracted.

Figure 5A:
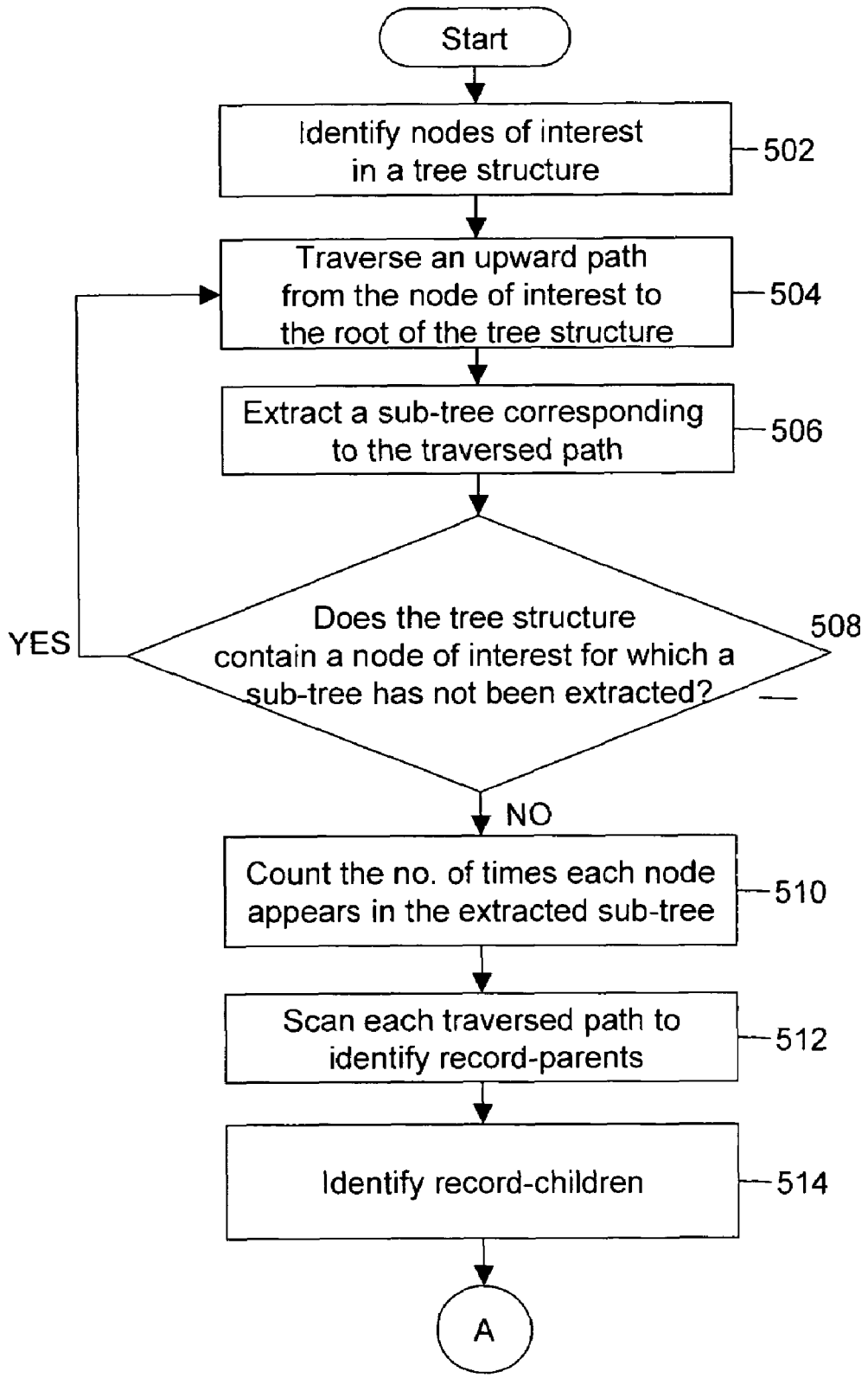
FIGS. 5A, 5B and 5C show a flowchart illustrating a method for identifying relevant information from a data set, in accordance with one embodiment of the present invention.
Figure 5B:
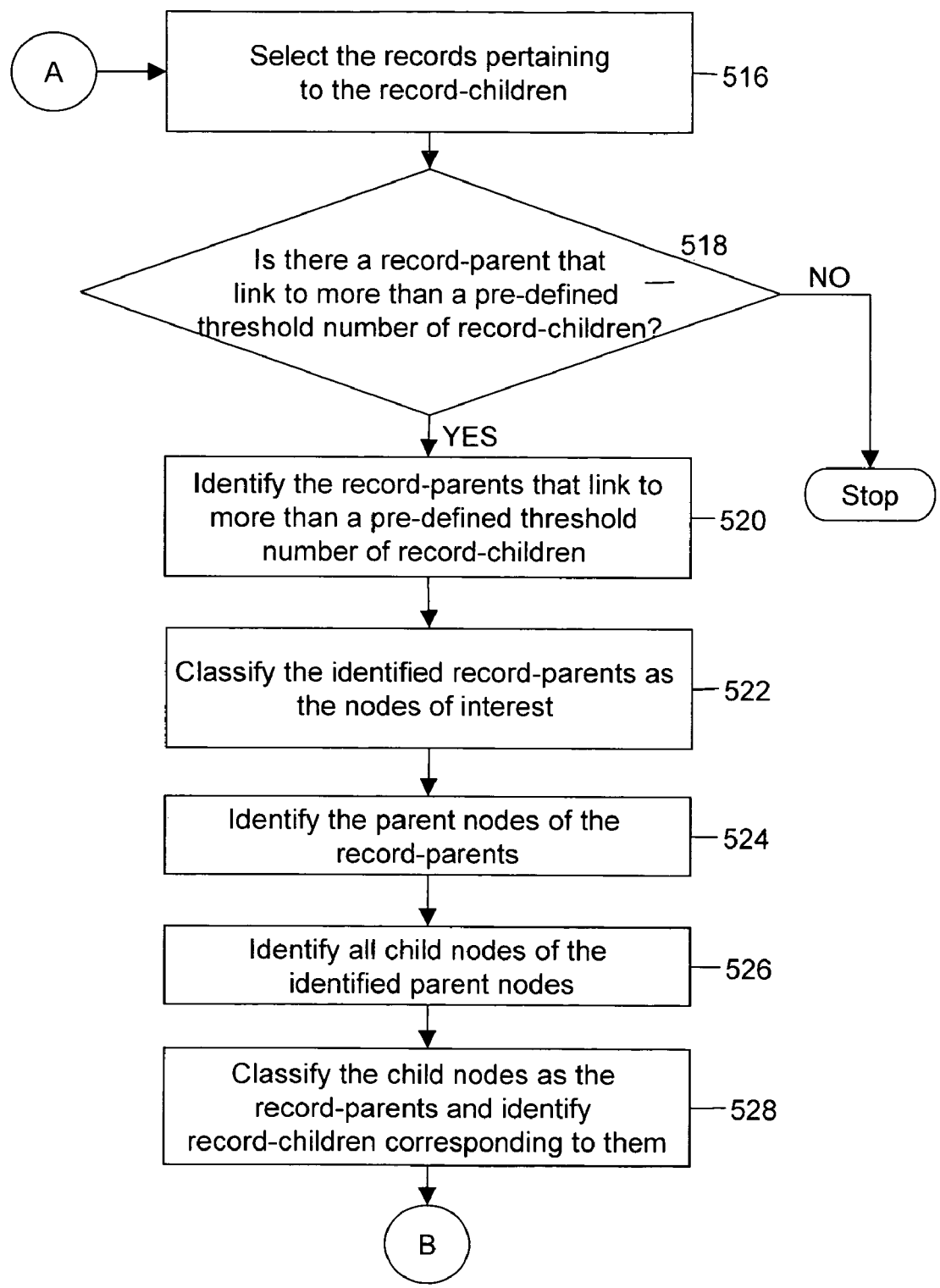
Figure 5C:
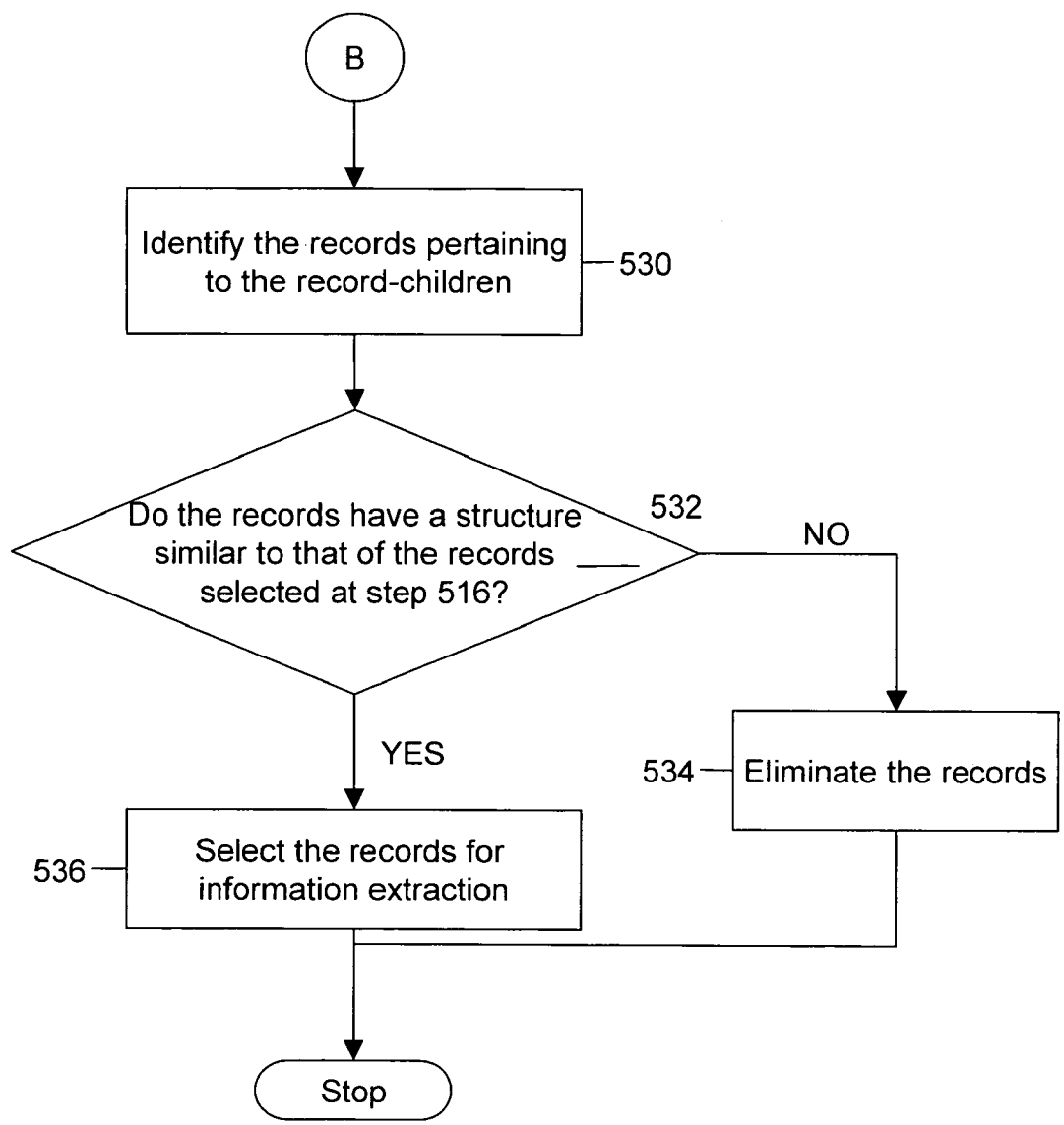

FIGS. 5A, 5B and 5C show a flowchart that illustrates a method for identifying relevant information from a data set in accordance with one embodiment of the present invention. At step 502, the nodes of interest are identified. Nodes of interest are the nodes that contain information, which is relevant to the pre-defined context. For example, in the tickets domain, the nodes of interest would be nodes that contain information about event venue, price, date or other such event related details.

Thereafter, at step 504, a node of interest is selected and an upward path from the selected node of interest to the root node is traversed. The upward path corresponds to a path that links the node of interest to its ancestor node, which is at a next higher level, and then to another ancestor node, which is at a further higher level, and so on until the root node is reached. For example, using FIG. 1 as an illustration, if F is the node of interest, then an upward path from node of interest F would be {F, E, D, C, A}. Further, at step 506, a sub-tree corresponding to the traversed path is extracted. The sub-tree is a hierarchical structure showing the relationship of each node of interest with its ancestor nodes in the tree structure.

At step 508, the tree structure is checked to confirm if it contains any node of interest for which an upward path has not been traversed. If there is such a node of interest, step 504 is executed. At step 504, such node of interest is selected and an upward path is traversed. Further, step 506 is executed to extract the sub-tree corresponding to the node of interest.

Referring back to step 508, if there is no node of interest for which an upward path has not been traversed, step 510 is executed. At step 510, the number of times each node appears in the extracted sub-trees is counted. A value or a count associated with each node is calculated based on the number of times the node appears in the extracted sub-trees. In the beginning, each node has a count equal to zero. Each extracted sub-tree is scanned and whenever a node is encountered, the count of that node is incremented by one. At the end of this process, the nodes may have a count equal to zero, one, or greater than one. For example, using FIG. 1 as an illustration, if F, I, M and Q are identified as nodes of interest, the extracted sub-trees will be {A, C, D, E, F}, {A, C, G, H, I}, {A, K, M} and {A, K, N, O, P, Q} respectively. Nodes F, E, D, I, H, G, M, Q, P, O and N will have count equal to one. Nodes C and K will have count equal to two. Node A will have count equal to four.

At step 512, the upward paths corresponding to the extracted sub-trees are scanned from the node of interest to the root node. This is done to identify the record-parents. The record-parents are the lowest nodes in the extracted sub-trees that have a count greater than one. According to the above-mentioned example, C and K are the lowest nodes that have a count greater than one. Hence, C and K are identified as the record-parents. Thereafter, at step 514, the record-children are identified. The record-children are the nodes in the extracted sub-trees that are child nodes of the record-parents. Child nodes of the record-parents are the immediate descendent nodes of the record-parents. For example, corresponding to record-parents C and K, the record-children will be D, G, M and N. The record-children are identified to select the records that contain information, which is relevant to the pre-defined context.

At step 516, the records are selected based on the identified record-children. Each record includes at least one record-children and nodes that are descendents of the record-children. For example, the records corresponding to the record-children D and G will be {D, E, F} and {G, H, I} respectively. Hence, record-children are the root nodes of the selected records. The selected records contain information, which is relevant to the pre-defined context. For example, the records {D, E, F} and {G, H, I} contain nodes F and I, which have been identified as nodes of interest. Hence, the records contain information, which is relevant to the pre-defined context.

In one embodiment of the invention, additional records are identified in the data set, based on the common patterns identified across different records. For example, using FIG. 1 as an illustration, the records {R, S, T}, {U, V, W} and {X, Y, Z} have a pattern similar to that of the previously selected records {D, E, F} and {G, H, I}. Hence, the records {R, S, T}, {U, V, W} and {X, Y, Z} are identified as additional records, which contain information related to the pre-defined context. The selected and additional records are used to extract the relevant information. Further, the extracted relevant information is stored in a data store. The details of extracting and storing relevant information are given in U.S. Provisional Patent Application No. 60/643,924 filed on Jan. 14, 2005, titled "Method and System for Information Extraction" the disclosure of which is hereby incorporated by reference.

In accordance with one embodiment of the present invention, at step 518, the extracted sub-trees are checked for the record-parents that link to more than a pre-defined threshold number of record-children. The threshold number is based on the pre-defined context. If such a record-parent exists, step 520 is executed. At step 520, all such record-parents are identified. Thereafter, at step 522, the identified record-parents are classified as the nodes of interest. This is done to identify the parent nodes of the record-parents that are identified at step 512. At step 524, the parent nodes of the record-parents are identified. For example, using FIG. 1 as an illustration, if node C is a record-parent, which is identified as node of interest, node A will be identified as parent node of node C.

Thereafter, at step 526, all the child nodes of the identified parent nodes are identified. The identified child nodes include previously identified record-parents and some other nodes. Therefore, according to above-mentioned example, C, B and K will be identified as child nodes. At step 528, the other nodes are classified as record-parents and record-children corresponding to these record-parents are identified. Hence, node B will be identified as record-parent and node J will be identified as record-children. Further, at step 530, the records corresponding to these record-children are identified. Therefore, the identified record will be {J,L}. At step 532, the records are checked to confirm if they have a structure similar to records selected at step 516. If the records do not have a structure similar to previously selected records, the records are eliminated at step 534. If they have a similar structure, step 536 is performed. At step 536, the records are selected for information extraction.

The present invention, as described above, offers various advantages. The records that contain relevant information can be identified. Further, the parent nodes of the records can also be identified. The information, which does not belong to a record or its parent node can be identified and eliminated. The present invention identifies additional records that are related to the pre-defined context.

The method for identifying relevant information, as described above, can be performed by a computer system. Typical examples of a computer system include a general-purpose computer, a programmed microprocessor, a micro-controller, a peripheral integrated circuit element, and other devices or arrangements of devices that are capable of implementing the steps that constitute the method of the present invention.

The computer system comprises a computer, an input device, a display unit and the Internet. Computer further comprises a microprocessor. Microprocessor is connected to a communication bus. Computer also includes a memory. Memory may include Random Access Memory (RAM) and Read Only Memory (ROM). Computer system further comprises a storage device. Storage device can be a hard disk drive or a removable storage drive such as a floppy disk drive, optical disk drive, etc. Storage device can also be other similar means for loading computer programs or other instructions into the computer system.

The computer system executes a set of instructions that are stored in one or more storage elements, in order to process input data. The storage elements may also hold data or other information as desired. The storage element may be in the form of an information source or a physical memory element present in the processing machine.

The set of instructions may include various commands that instruct the processing machine to perform specific tasks such as the steps that constitute the method of the present invention. The set of instructions may be in the form of a software program. Further, the software may be in the form of a collection of separate programs, a program module with a larger program or a portion of a program module. The software may also include modular programming in the form of object-oriented programming. The processing of input data by the processing machine may be in response to user commands, results of previous processing or a request made by another processing machine.

The present invention can be implemented in a variety of computer languages such as Java, C, C++, Perl, Python, LISP, BASIC, assembly, etc. The implementation of the present invention does not require any specific platform. Any platform that can provide means of support for simple arrays and associative arrays may be used. A few examples of such platforms are Windows™, Linux and Unix™.

While the preferred embodiments of the present invention have been illustrated and described, it will be clear that the present invention is not limited to these embodiments only. Numerous modifications, changes, variations, substitutions and equivalents will be apparent to those skilled in the art without departing from the spirit and scope of the present invention as described in the claims.

What is claimed is:

1. A method for identifying one or more records from a data set based on a pre-defined context, the data set being a web page captured from the Internet, the web page being represented as a hierarchical tree structure representing one or more nodes, wherein the pre-defined context defines an objective based on which the one or more records are identified, the pre-defined context being associated with its corresponding domain model, the method comprising the steps of:
   a. automatically selecting the pre-defined context for the web page;
   b. identifying one or more nodes of interest from the one or more nodes of the hierarchical tree structure, the one or more nodes of interest being identified based on the pre-defined context;

c. extracting one or more sub-trees based on the identified one or more nodes of interest, wherein each of the one or more extracted sub-trees being a hierarchical path showing the logical relationship of the one or more nodes of interest with its ancestor nodes in the hierarchical tree structure;

d. selecting one or more records corresponding to each of the one or more extracted sub-trees based on the pre-defined context, wherein each record comprises at least one node of interest and the corresponding parent node, the parent node of the at least one node of interest being referred to as a record-child, wherein selecting the one or more records comprises:

i. counting the number of times each of the nodes of interest appears in the one or more extracted sub-trees by scanning an upward path from the node of interest to the root node corresponding to each of the one or more extracted sub-trees and incrementing a count of the each of the nodes of the sub-tree based on the number of times each of the nodes of interest appear in the one or more extracted sub-trees;

ii. identifying a record-parent by scanning an upward path from a node of interest towards the root node of the hierarchical tree structure, corresponding to the each of the one or more extracted sub-trees, the parent node of the record-child being referred to as the record-parent, the record-parent being the lowest node in each of the corresponding one or more extracted sub-trees, wherein the identified record-parent has a count greater than one;

iii. identifying record-children for each identified record-parent, the record-children being defined as a child node of the record-parent in each of the one or more extracted sub-trees;

iv. selecting the identified record-children and all descendent nodes of the corresponding identified record-children, wherein each of the identified record-children along with the descendant nodes is referred to as a record; and e. storing each of the selected one or more records in a database, wherein a search enqine is built on the database to facilitate a user to search the database over the Internet based on a user query.

2. The method according to claim 1 further comprising the step of selecting one or more additional records in the hierarchical tree structure, wherein selecting the one or more additional records comprises identifying the parent node of the record-parent of the identified one or more records and selecting at least one additional record corresponding to at least one other record-parent, the at least one other record-parent being a child node of the parent node distinct from the record-parent of the identified one or more records, each additional record comprising descendent nodes of the corresponding child nodes of the corresponding other record-parents, wherein the at least one additional record is selected based on a structural similarity between the selected at least one record and the at least one additional record.

3. A system for identifying one or more records from a data set based on pre-defined context, the data set being a web page captured from the Internet, the web page being represented as a hierarchical tree structure representing one or more nodes, wherein the pre-defined context defines an objective based on which the one or more records are identified, the pre-defined context being associated with its corresponding domain model, the system comprising:

a processor;

a. a node identifier, the node identifier identifying one or more nodes of interest from the one or more nodes of the hierarchical tree structure, the one or more nodes of interest being identified based on the pre-defined context;

b. a sub-tree extractor, the sub-tree extractor extracting one or more sub-trees based on the identified one or more nodes of interest, wherein each of the one or more extracted sub-trees being a hierarchical path showing the relationship of the one or more nodes of interest with its ancestor nodes in the hierarchical tree structure;

c. a record recognizer, the record recognizer selecting one or more records corresponding to each of the one or more extracted sub-trees based on the pre-defined context, wherein each record comprises at least one node of interest and the corresponding parent node, the parent node of the at least one node of interest being referred to as a record-child, wherein selecting the one or more records comprises:

i. counting the number of times each of the nodes of interest appears in the one or more extracted sub-trees by scanning an upward path from the node of interest to the root node corresponding to each of the one or more extracted sub-trees and incrementing a count of the each of the nodes of the sub-tree based on the number of times each of the nodes of interest appear in the one or more extracted sub-trees;

ii. identifying a record-parent by scanning an upward path from a node of interest towards the root node of the hierarchical tree structure, corresponding to the each of the one or more extracted sub-trees, the parent node of the record child being referred to as the record-parent, the record-parent being the lowest node in each of the corresponding one or more extracted sub-trees, wherein the identified record-parent has a count greater than one;

iii. identifying record-children for each identified record-parent, the record- children being defined as a child node of the record-parent in the each of the one or more extracted sub-trees;

iv. selecting the identified record-children and all descendent nodes of the corresponding identified record-children, wherein each of the identified record children along with the descendant nodes is referred to as a record; and d. a data store, the data store storing the selected one or more records in a database, wherein a search engine is built on the database to facilitate a user to search the database over the Internet based on a user query.

4. The system according to claim 3, wherein the record recognizer further selects one or more additional records in the hierarchical tree structure, wherein selecting the one or more additional records comprises identifying the parent node of the record-parent of the identified one or more records and selecting at least one additional record corresponding to at least one other record-parent, the at least one other record-parent being a child node of the parent node distinct from the record-parent of the identified one or more records, each additional record comprising descendent nodes of the corresponding child nodes of the corresponding other record-parents, wherein the at least one additional record is selected based on a structural similarity between the selected at least one record and the at least one additional record.

5. A computer program product for use with a computer, the computer program product comprising a computer usable storage medium having a computer program code embodied therein for identifying one or more records from a data set based on a pre-defined context, the data set being a web page captured from the Internet, the web page being represented as a hierarchical tree structure representing one or more nodes, wherein the pre-defined context defines an objective based on which the one or more records are identified, the pre-defined context being associated with its corresponding domain model, the computer program code performing the steps of:

a. automatically selecting the pre-defined context for the web page;

b. identifying one or more nodes of interest from the one or more nodes of the hierarchical tree structure, the one or more nodes of interest being identified based on the pre-defined context;

c. extracting one or more sub-trees based on the identified one or more nodes of interest, wherein each of the one or more extracted sub-trees being a hierarchical path showing the logical relationship of the one or more nodes of interest with its ancestor nodes in the hierarchical tree structure;

d. selecting one or more records corresponding to each of the one or more extracted sub-trees based on the pre-defined context, wherein each record comprises at least one node of interest and the corresponding parent node, the parent node of the at least one node of interest being referred to as a record-child, wherein selecting the one or more records comprises:

i. counting the number of times each of the nodes of interest appears in the one or more extracted sub-trees by scanning an upward path from the node of interest to the root node corresponding to each of the one or more extracted sub-trees and incrementing a count of the each of the nodes of the sub-tree based on the number of times each of the nodes of interest appear in the one or more extracted sub-trees;

ii. identifying a record-parent by scanning an upward path from a node of interest towards the root node of the hierarchical tree structure, corresponding to the each of the one or more extracted sub-trees, the parent node of the record child being referred to as the record-parent, the record-parent being the lowest node in each of the corresponding one or more extracted sub-trees, wherein the identified record-parent has a count greater than one;

iii. identifying record-children for each identified record-parent, the record-children being defined as a child node of the record-parent in the each of the one or more extracted sub-trees;

iv. selecting the identified record-children and all descendent nodes of the corresponding identified record-children, wherein each of the identified record children along with the descendant nodes is referred to as a record; and e. storing each of the selected one or more records in a database, wherein a search engine is built on the database to facilitate a user to search the database over the Internet based on a user query.

6. The computer program product according to claim 5 further performing selecting one or more additional records in the hierarchical tree structure, wherein selecting the one or more additional records comprises identifying the parent node of the record-parent of the identified one or more records and selecting at least one additional record corresponding to at least one other record-parent, the at least one other record-parent being a child node of the parent node distinct from the record-parent of the identified one or more records, each additional record comprising descendent nodes of the corresponding child nodes of the corresponding other record-parents, wherein the at least one additional record is selected based on a structural similarity between the selected at least one record and the at least one additional record.

\* \* \* \* \*